United States Patent [19]

Dalton

[11] Patent Number: 4,817,870
[45] Date of Patent: Apr. 4, 1989

[54] VEHICLE-MOUNTED SPRAY APPARATUS

[75] Inventor: William J. Dalton, Ashton, Ill.

[73] Assignee: E. D. Etnyre & Company, Oregon, Ill.

[21] Appl. No.: 760,276

[22] Filed: Jul. 29, 1985

[51] Int. Cl.[4] .......................... B05B 9/06; B05B 1/20; B05B 1/16
[52] U.S. Cl. .................................... 239/157; 239/166; 239/168; 239/170; 239/172
[58] Field of Search ............ 239/71, 74, 124, 155–157, 239/166–168, 170, 172, 125, 127

[56] References Cited

U.S. PATENT DOCUMENTS

| 2,046,373 | 7/1936 | Etnyre . | |
|---|---|---|---|
| 2,256,639 | 9/1941 | Erickson | 239/124 |
| 2,472,199 | 7/1949 | Etnyre . | |
| 2,599,704 | 6/1952 | Etnyre . | |
| 3,239,148 | 3/1966 | Etnyre . | |
| 3,330,443 | 7/1967 | Etnyre | 239/155 X |
| 3,782,634 | 1/1974 | Herman | 239/156 |
| 3,853,272 | 12/1974 | Decker et al. | 239/155 |
| 4,083,494 | 4/1978 | Ballu | 239/170 X |
| 4,220,998 | 9/1980 | Kays | 239/172 X |
| 4,260,107 | 4/1981 | Jackson | 239/170 X |
| 4,274,586 | 6/1981 | Hill | 239/168 X |
| 4,530,463 | 7/1985 | Hiniker et al. | 239/155 X |

FOREIGN PATENT DOCUMENTS

23917/67  1/1969  Australia .
61324/80 12/1981 Australia .

OTHER PUBLICATIONS

Publication by Sundstrand Mobile Controls entitled "MCV104A Electrical Displacement Control," Feb. 1984, Bulletin 95-8965-3.

Primary Examiner—Andres Kashnikow
Assistant Examiner—Mary Beth O. Jones
Attorney, Agent, or Firm—Leydig, Voit & Mayer

[57] ABSTRACT

In a vehicle with a power source for moving said vehicle and for spreading liquid material on a road surface a material distributing apparatus is provided which includes a hydrostatic transmission and associated control mechanism for automatically maintaining a constant application rate of the material to the road surface in response to changes in the width of the application pattern. The hydrostatic transmission is responsive to the power source for providing a controlled rate of flow of the liquid material from the tank of the distributing apparatus, to a discharge element of the apparatus and onto the road surface so as to maintain a constant rate of application for the material despite changes in the speed of the vehicle. A pattern adjustment mechanism is provided for adjusting the pattern provided by the discharge element. The control mechanism is responsive to a change of the distribution pattern provided by the pattern adjustment mechanism to cause the hydrostatic transmission to adjust its rate of flow of the liquid material to the discharge element -- in relation to the speed of the power source and the resulting speed of the vehicle -- such that the rate of application remains unchanged.

9 Claims, 4 Drawing Sheets

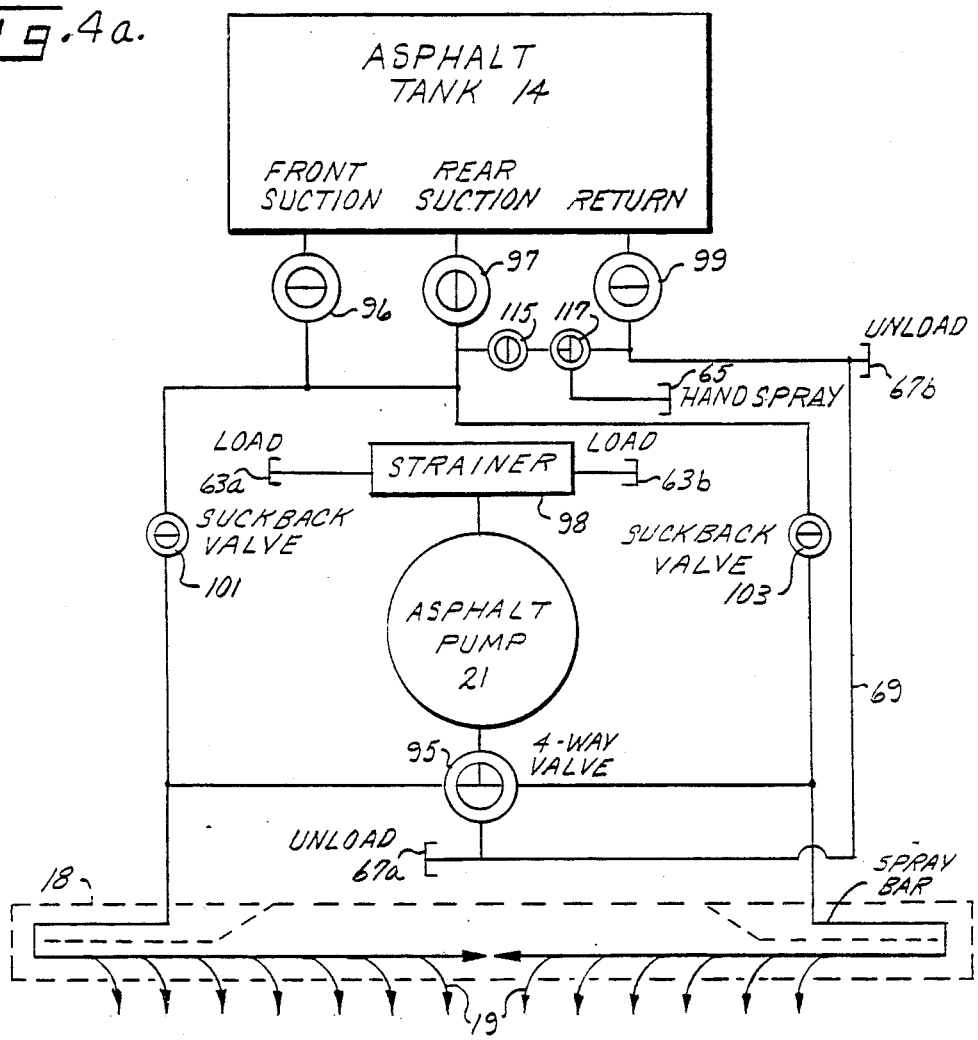
Fig.4a.
| POS | FUNCTION | 4-WAY | SUCTION | RETURN | L SUCKBACK R | |
|---|---|---|---|---|---|---|
| 1 | CIRC IN TANK | 0° | ON | O | CL | CL |
| 2 | CIRC IN BAR | 90° | ON | O | CL | CL |
| 3 | LOAD/DIST. PUMP | 0° | OFF | O | CL | CL |
| 4 | LOAD/EXT. PUMP | 0° | ON | CL | CL | CL |
| 5 | UNLOAD/H.SPRAY | 0° | ON | CL | CL | CL |
| 6 | SUCKBACK | 0° | OFF | O | O- | O- |
| 7 | OFF | 0° | OFF | CL | CL | CL |
| 8 | FLUSH/TRANSFER | 0° | OFF | CL | CL | CL |
Fig.4b.
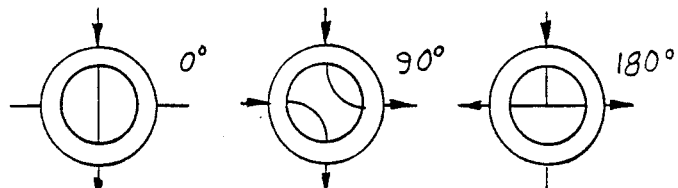
Fig.4c.
(i)  (ii)  (iii)

VEHICLE-MOUNTED SPRAY APPARATUS

TECHNICAL FIELD

This invention relates to a mobile material distributing apparatus carried on a vehicle such as a truck for spreading fluent or liquid material for surfacing roads, having a pumping system including a variable output pump and a discharge element, typically an elongated spray bar, fed by the pump and operable to spread the material over a width of the road surface determined by the length of the spray bar used. More particularly, the invention is concerned with the control of the rate of application of the distributed material.

BACKGROUND

In known mobile material distributing apparatus carried on a vehicle, a discharge pump is driven by the engine of the vehicle through a hydrostatic transmission that permits the selection of a drive ratio which produces and maintains a uniform application rate (e.g., gallons of material per square yard of road surface) through a given length of spray bar despite variations in the speed of the vehicle. In practice, the proper drive ratio of the hydrostatic transmission linking the vehicle engine and the pump is determined by making a trial run (i.e., material is circulated through the discharge pump but not discharged) and manually adjusting the drive ratio until the desired flow rate of material through the discharge pump is obtained for a given speed. Once the drive ratio is set, the rate of material flow from the discharge pump varies in accordance with the vehicle speed, thereby maintaining a uniform application rate of the material.

Often, distribution of material along the entire length of the spray bar is not desirable since the pattern is too wide for the area receiving the material. In some cases, the application of material requires spraying of irregularly shaped contours, such as in parking lots, around safety islands, junctions joining on/off ramps and main roads or intersections. Traditionally, these operations utilized the spray bar, reset to a narrower spraying width, as the primary means to apply the material, but the finishing application was done with a hand-held spray bar.

To vary the width of the spray bar, each of the nozzles along the length of the spray bar includes a valve which can turn the nozzle on or off. In addition, the spray bar is known to include hinged outer sections which may be raised to out-of-service positions in which flow through the nozzles of the wings is prevented. Spray bars equipped with hinged sections are particularly useful in areas where the overall length of the spray bar may physically interfere with a nearby structure, e.g., posts, walls, high curbs and the like.

When the effective length of the spray bar is changed, however, it is necessary to adjust the drive ratio of the hydrostatic transmission if it is desired to maintain the previous application rate. In the past, the selection of the new drive ratio has been a time-consuming operation requiring either fairly complex computations or another trial run. In addition, since the change in the drive ratio required manual adjustment, the risk of human error is created. Often, these manual attempts to adjust the drive ratio resulted in application rates which were noticeably different from the previous setting. Moreover, when a tapering in the road surface is encountered, it is not practical to expect an operator to successfully make the rapid adjustments required to maintain a constant application rate. Because of these inconveniences and problems, operators commonly forego the use of a shortened spray bar and, instead, use the handspray to finish all areas which cannot accommodate the full width of the bar. Obviously, this increased use of hand spraying substantially increases the post of surfacing.

More recently, mechanisms have been developed which eliminate the necessity for complex computations or trial runs when changing the width of the spray pattern. One example of such an apparatus is disclosed in U.S. Pat. No. 3,330,443 to Etnyre, which is assigned to the assignee of the present invention. The Etnyre patent utilizes an indicator arm, positioned automatically as an incident to the selection of the proper drive ratio for the hydrostatic transmission, which indicates the proper adjustment to the drive ratio if the effective width of the spray bar is changed. Although this apparatus represents a significant improvement in that complex computations and additional trial runs are eliminated, the apparatus still requires a manual adjustment of the drive ratio by the vehicle operator in response to any change in the length of the spray bar. Consequently, maintenance of a constant application rate is vulnerable to human errors made during the adjustment process.

Attempts have been made to totally eliminate the need for manual adjustments in order to hold the application rate constant after a change has been made to the effective length of the spray bar. These attempts have met with limited success. In one attempt, a pressure relief valve was placed in the routing network for the material in order to return the material to the tank when the pressure of the material in the spray bar surpassed the pressure setting of the valve and allowed material to return to the tank. Because a change in the effective length of the spray bar results in an increase in the pressure of the material flowing through the spray bar, the pressure relief valve inhibits an increased flow of material through the nozzles and, as a result, and increased application rate.

By providing a relief valve which functioned to reroute material back to the tank when excessive pressure of the material occurred, the pressure in the spray bar was regulated and, thus, a constant application rate could be maintained. Unfortunately, this approach required the operator of the vehicle to drive at a constant speed which, in practice, is not possible. Moreover, there was a second-order relationship between changes in the length of the spray bar and changes in pressure. Therefore, the relief valve functioned to maintain a substantially constant rate of application without substantial error for only small changes in the length of the spray bar. In addition, because the approach included return of extra flow when the pressure began to rise, there was no accurate way of determining the total amount of material being pumped through the nozzles. This rendered useless any attempt to determine an application rate by measuring the gallons per minute pumped by the discharge pump.

In another attempt to control the application rate, a hydrostatic transmission driving the discharge pump includes a pressure compensator which adjusts the drive ratio of the transmission so as to maintain constant pressure in the fluid lines connecting the pump and motor comprising the transmission. Unfortunately, this approach is plagued by the same problems of the previous approach which controls pressure in the return line for the spray bar, i.e., non-linearities and intolerance of variations in ground speed.

SUMMARY OF THE INVENTION

The general object of the present invention is to maintain constant application rates for the distributing apparatus in response to changes in the effective length of the spray bar without requiring manual readjustments and without the foregoing disadvantages of other automatic systems. In this connection, it is an object of the invention to maintain a constant application rate in response to changes in the effective width of the spray bar and changes in vehicle speed.

Yet another object of the invention is to provide for accurate and automatic control of the application rate while maintaining accurate indications of the material discharge rate.

A more specific object of the invention is to maintain a constant application rate by automatically controlling the discharge rate of the discharge pump by increasing or decreasing the discharge rate of the pump in direct proportion to increases and decreases in the width of the spray pattern in order that the distributing apparatus maintains a constant application rate.

A more detailed object of the invention is to provide an electronic control system which automatically adjusts the drive ratio of the hydrostatic transmission in response to operator-selected changes in the length of the spray bar.

A further object is to provide such an electronic control system which is simple in construction and relatively inexpensive to manufacture.

Still another object is to provide such electronic control system which, after a period of service use with a given vehicle, makes it possible to duplicate previously used application rates without an initial trial run, regardless of the effective length of the spray bar.

Other objects and advantages of the invention will become apparent from the following detailed description taken in connection with the accompanying drawings.

Briefly, the invention comprises a control mechanism for automatically regulating the application rate of a material distributing apparatus having a discharge element adjustable for paths of different widths and also having a pumping system which feeds the discharge element and which has a variable discharge rate. The control mechanism comprises three circuit elements: (1) a first circuit having manually responsive means movable through a range of positions to selectively vary the discharge rate of the pumping system between minimum and maximum limits; (2) a second circuit having manually responsive means for adjusting the discharge element in order to provide for application paths of different widths; and (3) a third circuit responsive to the second circuit for adjusting the discharge rate set by the first circuit in order to maintain a constant application rate for all widths of paths selected by the second circuit. The control mechanism includes a fourth circuit which is manually operable for selecting routes of the material through a network of pipes joining the holding tank of the material distributing apparatus to the discharge element. For selected routes, the fourth circuit automatically provides a predetermined discharge rate to the pumping system in order to best perform the function associated with the selected route.

BRIEF DESCRIPTION OF THE DRAWINGS

FIG. 4a is a schematic diagram of alternative routings for the material provided by a network of piping and valves associated with the discharge pump and the spray bar of the distributing apparatus;

FIG. 4b is a table of various combinations of valve positions which route material and thereby serve to perform various functions required for proper operation of the distributing apparatus; and FIGS. 4c(i) (ii) and (iii) represent the alternative flow paths through a four-way valve in the network of FIG. 4a for positions of 0, 90 and 180 degrees, respectively.

Figure 1:
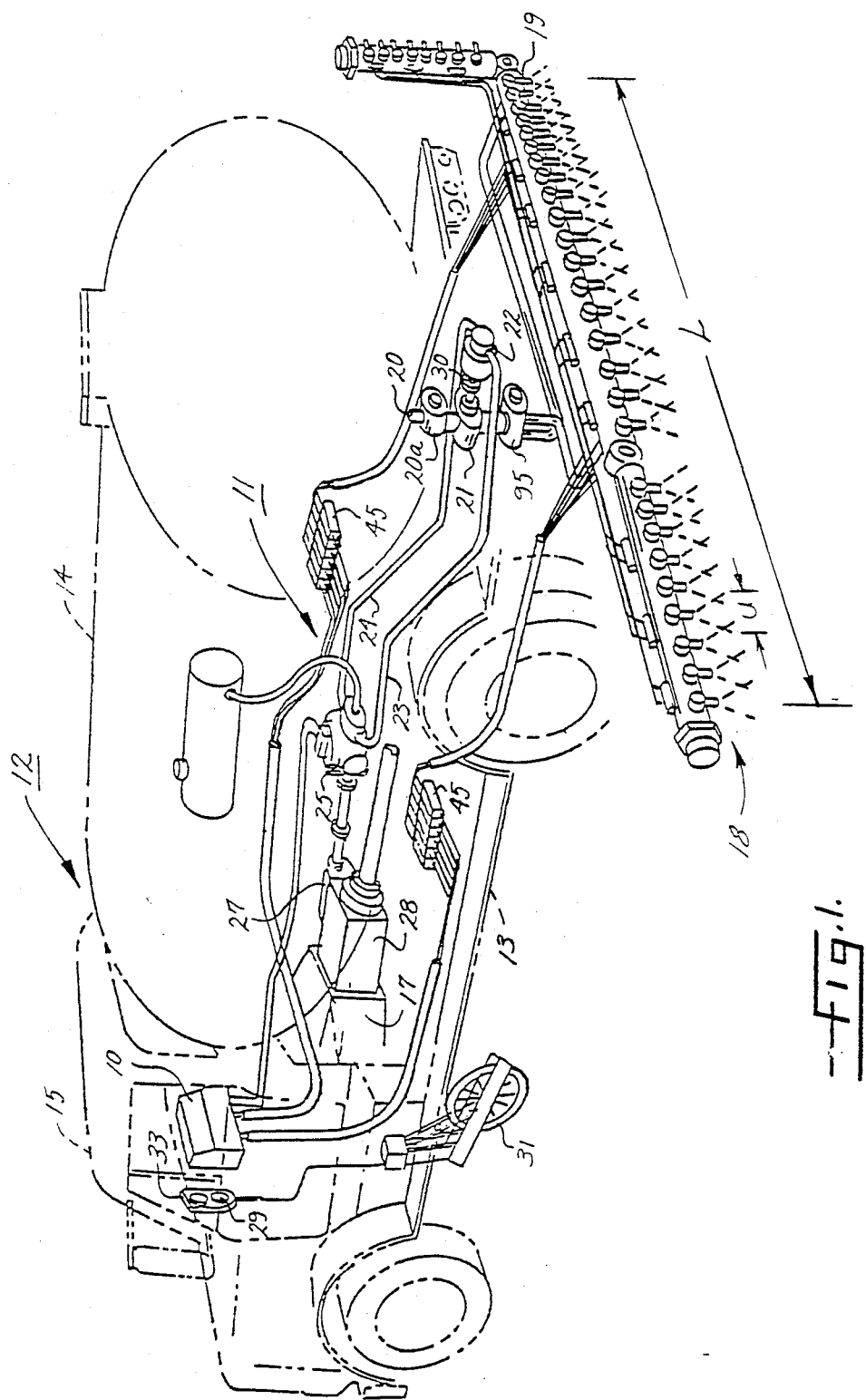
FIG. 1 is a perspective view of a distributing apparatus mounted on a vehicle and fed by a tank, the latter two shown in phantom, which may incorporate the control system of the invention.

While the invention is susceptible of various modifications and alternative constructions, the invention is shown in the drawings and herein described in detail with reference to the preferred embodiment, but it is to be understood that the invention is not intended to be limited to the specific form disclosed, but is intended to cover all modifications and alternative constructions falling within the spirit and scope of the invention as expressed in the appended claims.

DETAILED DESCRIPTION OF THE PREFERRED EMBODIMENT

Referring to FIG. 1, a distributing apparatus 11 for liquid bituminous material is carried by a truck 12 comprising a chassis 13 carrying a tank 14 on its rear portion and carrying a cab 15 and an engine 17 on its forward portion. At the rear of the truck 12 is a hollow spray bar 18 carrying a plurality of evenly spaced downwardly directed nozzles 19 to which the surfacing material such as hot liquid asphalt is pumped from the tank 14 to be sprayed onto a road surface. In the interest of brevity, the bituminous material distributed by the pumping system 11 will be hereinafter referred to as "asphalt", but the invention is intended for use in distributing all types of material, and the use of the term "asphalt" is not intended to limit the type of material distributed by the invention.

In a conventional manner, asphalt carried in the tank 14 is fed to the spray bar 18 through an intake port 20 adapted for connection to the tank through an intake valve 20a. This intake port 20 and valve 20a deliver asphalt held in the tank 14, to a discharge pump 21 (hereinafter referred to as an "asphalt pump") which establishes a flow rate for the asphalt as it passes to the spray bar 18. The pump 21 is of the "constant displacement per revolution" type, and the rate of the pump output (in units such as gallons per minute) is proportional to the rotational speed (in units of r.p.m.) at which the pump shaft is driven. It will be appreciated by those familiar with trucks carrying distributing systems that other ports such as a return port or a forward port (not shown) are also connected to the asphalt pump 21 through appropriate valves as will be discussed in greater detail in connection with FIGS. 4a-c.

In order that a constant application rate, A, (e.g., gallons per square yard of road surface) can be maintained, a power-take-off drive 27 (hereinafter referred to as PTO drive 27) from the transmission 28 of the truck 12 drives in a conventional manner a drive pump 25 and hydraulic motor 22 which, in turn, drives the asphalt pump 21 by way of a gear box 30. With the foregoing drive train, and with the truck transmission 17 set to a given gear ratio, the discharge rate X from the asphalt pump 21 is directly proportional to the speed, Y, of the truck 12. Specifically, as the truck 12 varies in speed, the rotational speed of the pump 25 and the rate of flow of hydraulic fluid through the motor 22 correspondingly vary, so the driven rate of rotation of the asphalt pump 21 correspondingly varies. Therefore, the asphalt pump 21 increases the flow of asphalt to the spray bar 18 as the truck 12 accelerates and reduces the flow to the bar as the truck slows. As a result of this relationship between the discharge rate X of the asphalt pump 21 and the speed Y of the truck 12, a uniform application rate A of the asphalt to the road surface is assured.

At low rates of rotation of the asphalt pump 21, the small momentum of the pistons in the hydraulic motor 22 is of the same magnitude of the frictional forces and, as a result, the pistons tend to move in a jerking manner. In order to avoid such jerking motion, the hydraulic motor 22 is connected to the asphalt pump 21 by way of the gear box 30 which reduces the rate of rotation for the shaft driving the pump. Such an arrangement allows the hydraulic motor 22 to operate successfully over a range of rotational speeds wherein the minimum rate is well above the rate at which a jerking motion of the motor output shaft might be produced.

In order to adjust the application rate A of the asphalt onto a road surface, it is known in the art to make the drive pump 25 a variable-displacement type having an adjustable swash plate (not shown in FIG. 1) to control the rate of flow of fluid through lines 23 and 24 developed in response to the rotation of the input shaft from the PTO drive 27. By a mechanical adjustment which changes the angle of the pump swash plate, the rate of the fluid flow through lines 23 and 24 may be controlled, and the ratio between the rate of rotation $\omega_1$ of the PTO drive 27 and the driven rate of rotation $\omega_3$ of the shaft of pump 21 may be changed. Since the discharge rate X of the asphalt pump 21 directly depends on its rate of rotation $\omega_3$, an adjustment of the drive ratio $\omega_1/\omega_3$ allows the discharge rate X of the asphalt pump 21 to be changed without a corresponding change in the ground speed of the truck 12. Of course, by changing the discharge rate X without a corresponding changing of the speed Y of the truck 12, the application rate A is changed.

Typically, with a prescribed application rate A and selected effective length L of the spray bar, a pre-computed reference table is used to show the recommended speed Y of the truck 12 in feet per minute and the corresponding discharge rate X of the asphalt pump 21 in gallons per minute which are necessary to produce the desired application rate A. Once value for the speed Y and discharge rate X are taken from the table, the truck makes a trial or "dry" run at the prescribed speed as measured by a so-called bitometer 29 with the asphalt circulating back into the tank 14 instead of out through the nozzles 19 of the spray bar 18.

During the trial run, the bitumeter 29 indicates the ground speed of the truck 12 in feet per minute sensed by a ground wheel 31. It also indicates on a tachometer dial 33, calibrated in gallons per minute, the discharge rate from the pump 21, the tachometer being actuated from a pick-up (not shown) on the input shaft of the pump. The operator adjusts the angle of the swash plate in the drive pump 25, by setting an adjustment linkage as described in U.S. Pat. No. 3,330,443, until a drive ratio $\omega_1/\omega_3$ is achieved which gives the prescribed discharge rate X, as indicated on the tachometer dial 33.

Figure 2:
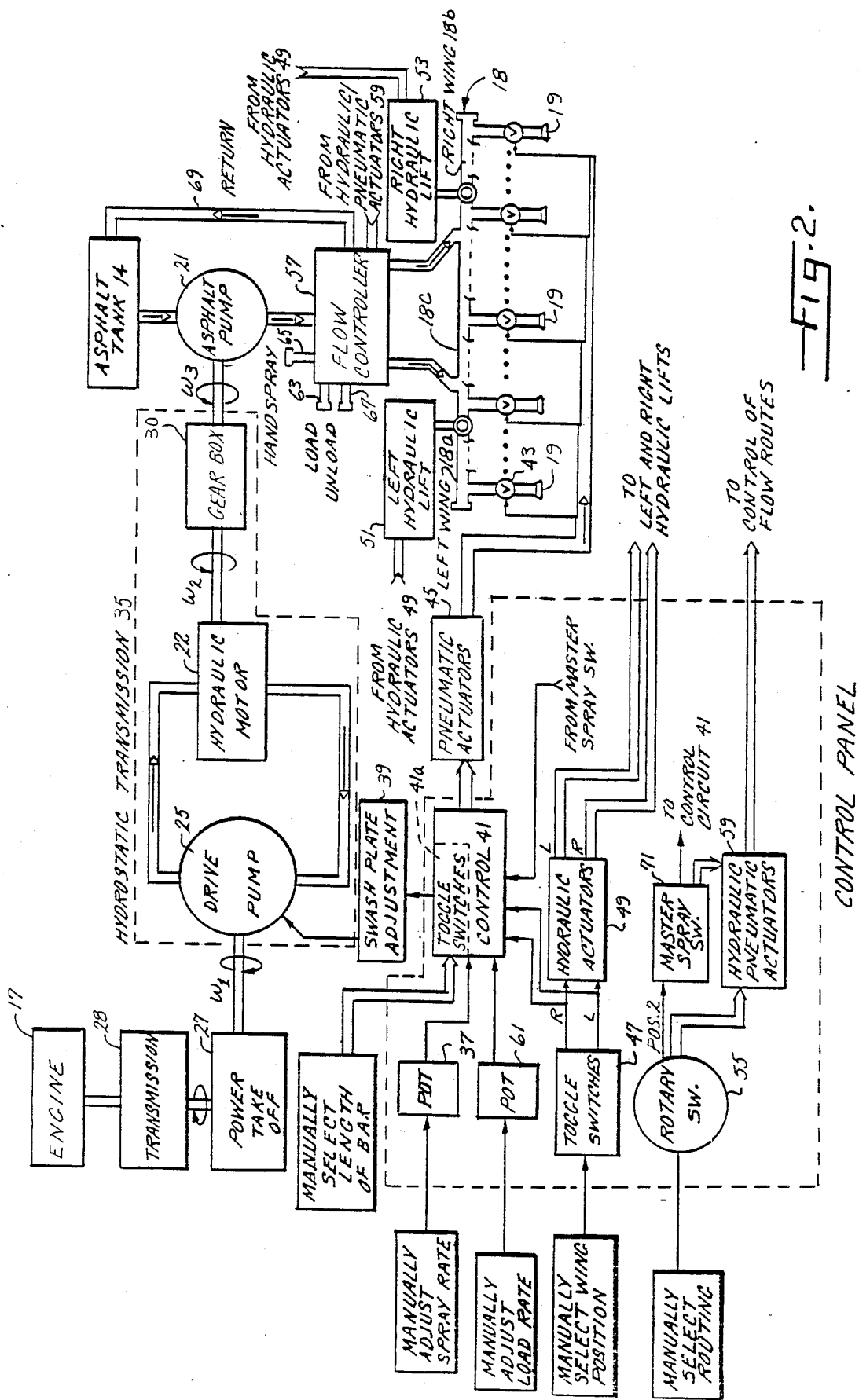
FIG. 2 is a block diagram of the distributing apparatus of FIG. 1 showing the component blocks of the distributing apparatus including those components of the control system of the invention which execute an automatic adjustment of the drive ratio between the power-take-off drive and the discharge pump in response to changes in the effective length of the spray bar.

Referring to FIG. 2, the drive pump 25, hydraulic motor 22 and gear box 30 collectively constitute a hydrostatic transmission 35 whose drive ratio $\omega_1/\omega_3$ is controlled by the adjusted mechanical position of a member which determines the swash plate angle in the drive pump. In accordance with one aspect of the present invention, and to cooperate with automatic bar length compensation apparatus later to be described, the adjustment of thee hydrostatic transmission ratio (i.e., the setting of the member which determines swash plate angle) is effected by an electromagnetic actuator 39 (FIG. 2) here shown as a solenoid 75 (FIG. 3) associated with an armature 77 which shifts to different positions according to the magnitude of excitation current $I_s$. To afford adjustment of the angle of the swash plate, a manually adjustable potentiometer 37 is mounted on the control panel 10 to provide an angle-adjustment signal to a swash plate adjustment mechanism 39 via a control circuit 41. The swash plate adjustment mechanism 39 may be a commercially available solenoid-armature device for controlling the angle of the associated pump swash plate. An example of one suitable device is the Electrical Displacement Control, Model MCV 104A, manufactured by Sundstrand Mobile Controls of Minneapolis, Minn.

Figure 3:
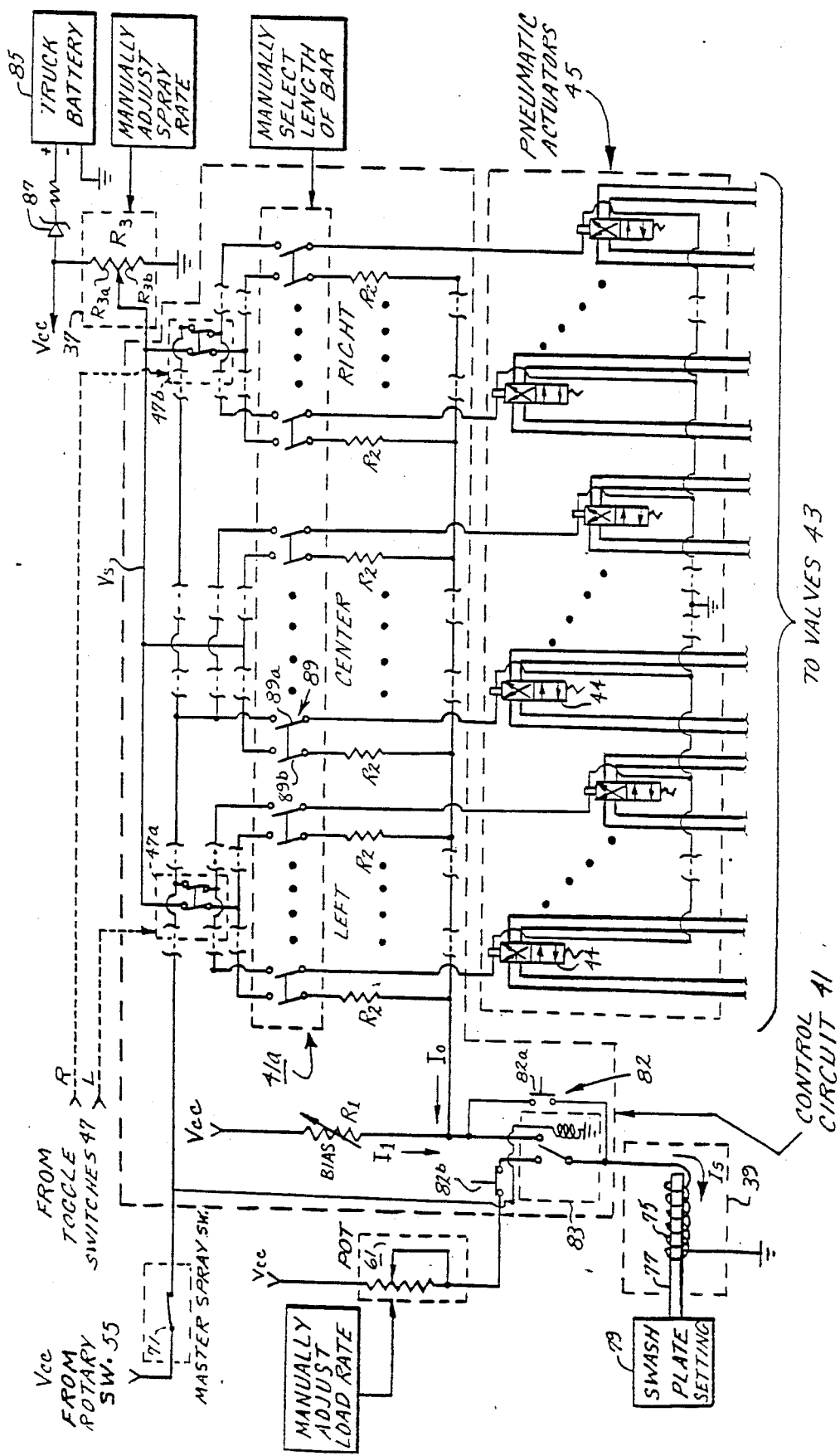
FIG. 3 is a schematic diagram of the particular component block in FIG. 2 which generates command signals to move the swash plate of the drive pump in response to a change in the effective length of the spray bar.

In accordance with another aspect of the invention, the spray bar 18, which exists at the back of the truck with a given and relatively great physical length, is associated with components and controls that permit its effective length to be changed conveniently and quickly—indeed, "on the fly"—by the human operator or truck driver sitting in the cab. For this purpose, each of the nozzles (or each adjacent pair of nozzles) 19 is fed via one of a plurality of pneumatically-actuated or-off valves 43 such that as each valve is turned on or off an effective unit length U is added to or subtracted from the effective length L of the spray bar 18. The valves 43 are controlled by a like plurality of pneumatic actuators 45 which (as shown in FIG. 3) take the form of solenoid valves 44 which act, when their solenoids are energized or deenergized, to send or vent pneumatic pressure (from a source and reservoir, not shown) to or from the respective valves 43 such that the latter are opened or closed. The solenoids for the several valves 44 are turned on or off by respective ones of switch contacts 89a in double pole toggle switches 89 within a switch group 41a. These toggle switches 41a are physically disposed on the control panel 10 in the truck cab (FIG. 1) but appear schematically in FIG. 3.

By opening and closing the toggle switches 41a, the operator may thus determine the number of side-by-side nozzles 19 which actively discharge asphalt material and thus the effective length of the spray bar 18. If it is assumed that each active nozzle discharges liquid over a unit distance U lengthwise along the spray bar, then the effective length L is equal to $N \times U$, where N is the number of switches 89 which are closed.

As long as the length L of the spray bar 18 remains constant, the initial setting of the drive ratio $\omega_1/\omega_3$ (established by the adjusted position of the wiper of potentiometer 37) maintains a uniform rate of application A, regardless of the variations in ground speed Y. When the truck 12 reaches a wider or narrower stretch of road and the effective length L of the spray bar 18 is changed, however, the application rate would, without more, depart from the desired value. This can be most easily appreciated by stating the application rate A in terms of the speed Y of the truck 12, the discharge rate X of the asphalt pump 21 and the effective length L of the spray bar 18 as follows:

$$\text{Application rate} = \frac{\text{(discharge rate)}}{\text{(truck speed) (width of spray pattern)}} \quad (1)$$

$$A = \frac{X \text{ gallons per minute}}{(Y \text{ feet per minute}) (L \text{ feet})} = \frac{X}{Y \cdot L} \text{ gallons/sq. feet} \quad (2)$$

Recalling that the discharge rate X is proportional to engine speed and truck ground speed Y, then $$X = k_1 Y \quad (3)$$

where $k_1$ is a factor of proportionality determined by the adjusted value of the ratio $\omega_1/\omega_3$ By combining (2) and (3):

$$A = k_1 Y/YL = k_1/L \quad (4)$$

The application rate will remain constant as truck speed Y varies, but it will change inversely if the effective spray bar length is changed.

The control panel 10 mounts a plurality of switches and potentiometers which may be set or adjusted to control different functions associated with the distributing apparatus 11. Specifically, manual actuation of the toggle switches 89 in the group 41a, selects the effective length of the spray bar 18, as explained above. A second pair of toggle switches 47 (FIG. 2), may be manually operated to control the raising and lowering of the left and right wings 18a and 18b of the spray bar 18. In response to manual operation of the toggle switches 47, hydraulic actuators 49 provide hydraulic signals to the left or right hydraulic lift 51 or 53, which serve to raise or lower the wings 18a and 18b, respectively. In addition, ganged left and right limit switches 47a, 47b (FIG. 3) serve to enable or disable the nozzle control valves on a given wing 18a or 18b when it is down (active) or up (inartive).

In order to control the flow route of the asphalt through piping connecting the asphalt pump 21, the spray bar 18 and the asphalt tank 14, a manually operable rotary switch 55 (FIG. 2) is included on the control panel 10. Each position of the rotary switch 55 activates a particular combination of valves in the flow route controller 57 by way of hydraulic/pneumatic actuators 59, thereby causing the asphalt to circulate along a predetermined path. For example, in response to a selected one of the positions of the rotary switch 55, a return line 69 connecting the output of the asphalt pump 21 to the asphalt tank 14 recirculates the asphalt back to the tank by activation of certain valves in the flow route block 57. Other particular positions of the rotary switch 55 activate valves which enable an output 65 for a handspray or an output 67 for unloading the tank 14.

When the rotary switch 55 is positioned in the particular position to activate appropriate valves in the piping of the flow controller 57 so as to allow asphalt to be pumped into the spray bar 18, the asphalt will be distributed to the road surface only if a manually operable master spray switch 71 on the control panel 10 provides an activation signal to the control circuit 41 and to the hydraulic/pneumatic actuators 59. In response to an activation signal from the master spray switch 71, the control circuit 41 opens those valves 43, and causes spraying through those ones of the nozzles 19, which correspond to the selected toggle switches 41a.

In addition, the activation signal from the master spray switch 71 also provides a load/spray indication to the control circuit 41 in order that the angle of the swash plate is adjusted to provide a drive ratio $\omega_1/\omega_3$ which results in an appropriate flow of asphalt, depending on what routing has been chosen by the rotary switch 55. The particular flow routes associated with the positions of rotary switch 55 are discussed in greater detail in connection with FIGS. 4a–c.

In connection with the load/spray indication, a rheostat 61 (FIGS. 2 and 3) provides an adjustable signal to the swash plate adjustment mechanism 39 via the control circuit 41 for controlling the angle of the swash plate of the drive pump 25 in response to a load indication and consequent deactivation of a relay 83. The load indication results from the master spray switch 71. The routing results from a particular position of the rotary switch 55 which activates the hydraulic/pneumatic actuators 59 for routing asphalt.

Without an activation signal from the master spray switch 71 to the control circuit 41, all the valves 43 will remain closed and the asphalt will merely circulate within the bar 18. Since the activation of the master spray switch 71 allows the asphalt to be discharged instead of recirculated to the tank 14, a slight change in the routing of the asphalt is necessary. Therefore, activation of the master spray switch 71 activates relay 83 connecting the spray rate potentiometer 37 to the solenoid magnet 75 and causes the hydraulic/pneumatic actuators 59 to activate a valve in the control of flow controller 57 that reroutes the asphalt to provide a route more conducive to discharging. This rerouting will be discussed in greater detail in connection with FIGS. 4a–c.

In keeping with the invention, a constant application rate A is maintained by means in the control circuit 41 for automatically adjusting the discharge rate X of the asphalt pump 21 in response to changes in the selected width of the application pattern for the asphalt, that is, changes in the effective length of the spray bar 18. In response to the manual selection of the width of the spray pattern by activation of selected toggle switches 41a, the control circuit 41 responds by adjusting the drive ratio $\omega_1/\omega_3$ of the hydrostatic transmission 35 so as to compensate for the change in the effective length L of the spray bar 18 by increasing or decreasing the discharge rate X of the asphalt pump 21. By way of example, if the discharge rate X were not adjusted downwardly in response to a shortening of the effective length L of the spray bar 18 when some of the nozzles are disabled, the asphalt pump 21 would discharge the same amount of asphalt through a shorter length of the bar. As a result, the asphalt would be applied as a thicker layer, i.e., the application rate would increase.

But, by automatically decreasing (or increasing) the discharge rate X in response to the selection of a shorter (or longer) effective length L of the spray bar 18 in accordance with the invention, the previously selected application rate A is maintained at a constant value.

To control the angle of the swash plate 79 in the drive pump 25 and thereby control the drive ratio $\omega_1/\omega_3$, the solenoid armature 77 is coupled to a mechanical link for adjusting the swash plate angle in response to changes in the magnitude of the current applied to the solenoid magnet from the control circuit 41. The armature 77 of the solenoid 75 is linked to the swash plate 79 of the drive pump 25 by conventional mechanical or hydraulic linkages (not shown) such that changes in the angle of the swash plate, or, more particularly, changes in the pump displacement per revolution, are linearly related to changes in the current $I_s$ from the control circuit 41.

In order to control the position of the armature 77, current $I_s$ reaches the solenoid 75 via parallel paths formed by the toggle switches 41a which lead from an adjustable source voltage $V_s$ picked off of the potentiometer 37. Assuming the load/spray relay 83 contacts are positioned as shown in FIG. 3, current $I_1$ passes from the constant source voltage $V_{CC}$, developed by a voltage-regulating zener diode circuit 87 fed from the truck battery 85, through biasing rheostat $R_1$. The current component $I_1$, merely compensates for a "dead band" region of the solenoid-armature combination so as to make the position of the armature 77 vary essentially linearly with changes in a second current component $I_0$. The exciting current $I_s$ is the sum of $I_0$ and $I_1$, but the armature position is proportional to $I_0$. To enable the operator of the vehicle to set the discharge rate of the asphalt pump 21 during a trial run without enabling the master spray switch 71, a double-pole momentary switch 82 is provided on the control panel 10. When the operator presses the momentary switch 82, contact 82a closes and contact 82b opens, thereby disabling rheostat 61 and enabling the bank of toggle switches 41a and the spray rate potentiometer 37.

In keeping with the invention, the toggle switches in the group 41a are each double-pole, single-throw switches 89 which, when closed, simultaneously (i) activate an associated solenoid valve 44 of the pneumatic actuators 45 by way of contacts 89a and (ii), by way of contacts 89b, create a signal to the swash plate adjustment mechanism 39—i.e., an incremental increase in the current delivered to the solenoid 75. For this latter purpose, a current path leads from the wiper of the potentiometer 37 (across which the source voltage $V_{CC}$ is applied) through each of the switch contacts 89b and one of a plurality of equal-valued resistors $R_2$ and via the contacts of relay 83 to the solenoid 75. The current $I_0$ is constituted by the sum of the currents through those ones of the switch contacts 89a which are closed and their respective resistors $R_2$.

At any time, the number of closed switches 89 is N, the circuit leading from the potentiometer 37 to the solenoid 75 includes N resistors $R_2$ in parallel (and N valves 43 are turned on to render their associated nozzles active). The parallel array of resistors $R_2$ is served by a source voltage $V_s$ which is adjustable and has a value:

$$V_s = V_{CC} \cdot \frac{R_{3b}}{R_{3a} + R_{3b}}$$

where $V_{CC}$ is constant voltage created by the zener diode 87 despite any changes in the voltage of the truck battery 85, and $R_{3a}$ and $R_{3b}$ are the ohmic values of the upper and lower portions of the potentiometer 37 as its wiper is adjusted to different positions. Assuming that the solenoid 75 has negligible resistance, the value of the current $I_0$ fed through the solenoid 75 is expressable as $$I_0 = \frac{V_s}{R_2/N} = \frac{N V_s}{R_2} \tag{5}$$

where N is the number of equal resistors $R_2$ connected in parallel by the quantity of the switches 89 which are closed.

The setting of the wiper on potentiometer 37 determines the application rate A (in gallons per square yard or gallons per square foot) when any given quantity of the nozzles are active and the spray bar 18 has a given effective length L. It is adjusted to achieve a desired spray rate during a dry run of the truck at a given speed, as explained above. And, once it is set, the voltage $V_s$ will act to keep the application rate A essentially constant when the truck is operated with a given ratio of the transmission 17 regardless of changes in ground speed due to changes in engine speed. This occurs because the input drive speed to the hydrostatic transmission 35 increases or decreases in proportion to increases or decreases in engine speed and truck ground speed, the current $I_0$ being otherwise constant and the swash plate angle in the pump 25 being unchanged.

As spraying of the asphalt material proceeds, and if the effective length L of the spray bar 18 is changed by opening of more switches 89 or closing of additional switches 89, the current $I_0$ will be incrementally increased or decreased in proportion to the subtractions or additions of unit lengths U which make up the effective length. Because the position of the armature 77 changes linearly with changes in the current $I_0$, the angle of the swash plate 79 in the pump 25 is changed to make the ratio $\omega_1/\omega_3$ also change linearly with the number of switches 89 which are closed—and thus to change the discharge rate X from the asphalt pump 21 linearly with charges in the number of closed switches 89. Thus, it may be seen that the switch contacts 89a cause the effective spray bar length always to be equal to:

$$L = U \times N \tag{6}$$

as N takes on different values. But also, the switch contacts 89b make the discharge rate X charge automatically as N changes.

More particularly, the constant $k_1$ in Eq. (3) represents the ratio $\omega_1/\omega_3$. As the number of closed contacts 89a changes the ratio and the constant take on different values, such that:

$$k_1 = k_2 I_0 = \frac{k_2 N V_s}{R_2} \tag{7}$$

where $k_2$ is simply a factor of proportionality. By combining Eqs. (6) and (7) into (4):

$$A = \frac{k_2 N V_s}{R_2 \times U \times N} = \frac{k_2 V_s}{R_2 U} \tag{8}$$

The unit length U, the constant $k_2$ and the resistance value $R_2$ are constants chosen by design; and thus the application rate A is determined by the adjusted setting of the potentiometer 37 and the value of the source voltage $V_s$—as confirmed by Eq. (7). The apparatus of the present invention thus not only makes the application rate A independent of truck ground speed Y, it also makes the application rate A independent of the effective length L as the truck operator sits in the cab and flips the different toggle switches to change the length L. Once the potentiometer 37 is set in a given position, the desired application rate A will be automatically maintained.

The individual toggle switches 89 within the group 41a are divided into three sub-groups which correspond to the three sections of the spray bar, i.e., the left and right wings 18a and 18b, respectively, and the center section 18c. In the center section of the toggle switches 41a, each double-pole, single-throw switch 89 has its constants 89a connected to receive the voltage $V_{CC}$ by way of the master spray switch 71. The contacts 89b of each switch 89 are connected to receive the adjustable voltage $V_s$ from the potentiometer 37, as explained above. If the entire length of the spray tar 18 is to be activated for spraying, then the entire group of toggle switches 41a are closed and all of the solenoid valves 90 of the pneumatic actuators 45 are activated so as to open all the valves 43.

In keeping with the invention, when the left or right wing 18a or 18b of the spray bar 18 is raised by closure of the appropriate one of toggle switches 47, the limit switches 47a or 47b are opened when the hydraulic actuators 49 activate either the left or right hydraulic lifts 51 or 53. Opening of switch contacts 47a or 47b cuts off both the voltage supply $V_{CC}$ and the source voltage $V_s$ from the left or right sections of the toggle switches 41a, respectively. Since the voltage source $V_{CC}$ is disconnected, the valves 43 associated with the lifted wing are closed and spraying from that lifted portion of the bar cannot continue. Moreover, since the source voltage $V_s$ is disconnected, the current $I_0$ to the solenoid 75 is reduced if the wing being lifted was distributing asphalt from its nozzles 19. Because lifting either or both wings 18a or 18b obviously changes the width of the spray pattern, the change in the current $I_0$ advantageously changes the angle of the swash plate 79 which, as explained above, changes the discharge rate X of the asphalt pump 21 in a fashion to maintain the previously-established application rate A.

For example, in response to an activation signal on line "L" from the hydraulic actuators 49, the contacts of the double-pole, single-throw contacts 47a will open and, thereby, disconnect from the voltage source $V_{CC}$ from the set of resistors $R_2$ and the set of solenoid valves 44 of the pneumatic actuators 45 corresponding to the left wing 18a. As a result of this disconnection, the valves 43 of the left wing 18a are closed, and they cannot be accidentally activated even if the corresponding ones of the switches contacts 89a are closed. Further, the solenoid current $I_0$ has no contribution from the resistors $R_2$ associated with the left wing, even if the corresponding ones of the contacts 89b are closed. Thus, the raising of either the left or right wings, 18a or 18b, respectively, can be done without regard to the position of the toggle switches 89 associated with the valves 43 in the left and right wings.

To prevent the spraying of asphalt when the truck operator wishes to circulate the asphalt through the spray bar 18 without distributing it onto the road surface, the master spray switch 71 permits interruption of the voltage delivered to the solenoid valves 44 by the toggle switch contacts 89a. Therefore, in order for the distributing apparatus 11 to spray asphalt, the master spray switch 71 must be in its closed position. In addition, voltage from the truck battery 85 is received by the master spray switch 71 only when the rotary switch 55 is in a predetermined position such that the routing of the asphalt is appropriate for spraying.

To provide control of the asphalt pump 21 when the master spray switch 71 is not activated, the potentiometer 61 provides an adjustable current source which can be connected to the solenoid 75 as an alternative source of current by activation of the load/spray relay 83. The activation of the load/spray relay 83 is in response to the load/spray indication from the master spray switch 21 that results in the pump 21 sending asphalt from a bulk source (e.g., tank 14) through the flow routing controller 57.

In preparing the distributing apparatus 11 incorporating the invention for operation at a prescribed application rate A (for example, 0.5 gallons per square yard) with a length L of the spray bar 18 dictated by the width of the surface to be treated (for example, a bar 10 feet long), the operator of the truck 12 consults a reference table (not shown) to determine the suggested road speed Y and the discharge rate X of the asphalt pump 21. For the assumed figures stated above, the suggested speed Y is 180 feet per minute and the rate X is 100 gallons per minute. The truck operator then drives the truck 12 at the suggested speed with the asphalt recirculated by the asphalt pump 21 back into the tank 14 as will be discussed more fully hereinafter.

As the operator drives the truck 12 at the suggested speed by observing the "speedometer" 29, he adjusts the potentiometer 37 until the discharge rate X, as indicated by the pump tachometer 33, reaches 100 gallons per minute, thereby establishing the proper drive ratio $\omega_1/\omega_3$ for the hydrostatic transmission which will produce the desired application rate of 0.5 gallons per square yard for a spray width of 10 feet, regardless of the speed of the truck 12. When the truck operator wishes to change the width of the spray pattern, a simple repositioning of the toggle switches 41a or the control panel 10 results in an adjusted width pattern and, in keeping with the invention, the drive ratio $\omega_1/\omega_3$ of the hydrostatic transmission 35 is automatically adjusted in order to change the discharge rate X of the asphalt pump 21 and thereby maintain the same application rate A.

An additional feature of the invention is the ease of duplicating a previously used application rate A at a later time no matter what effective length L of the spray bar 18 is selected. When the operator wishes to return to a previously used application rate A, he simply consults his records for the previously recorded position (on a numerical scale) of the knob for potentiometer 37. Once the drive ratio $\omega_1/\omega_3$ has been set by adjustment of the potentiometer 37 so as to provide the desired discharge rate A, the control circuit 41 automatically modifies the drive ratio $\omega_1/\omega_3$ to account for the selected length L of the spray bar 18 by further adjusting the drive ratio of the hydrostatic transmission 35. With this arrangement, the need for trial runs is substantially eliminated after obtaining sufficient experience with the particular truck 12 carrying the distributing apparatus 11.

In order to control routing of the asphalt, the control of flow controller 57 of FIG. 2 is implemented by a plurality of valves as shown in FIG. 4a whose positions are coordinated by the rotary switch 55 so as to provide alternative flow routes for the asphalt. Each position of the rotary switch 55 selectively activates the valves in order to provide a routing of asphalt flow which is appropriate for the intended function. FIG. 4b indicates eight possible combinations of valve positions which correspond to eight functions of the distributing apparatus. Each of the combinations of valve positions may be selected by one position of the rotary switch 55. A ninth function, actual spraying of asphalt, is implemented by closing the master spray switch 71 when the rotary switch 55 has selected a particular one of its eight possible positions.

In the first position of the rotary switch 55, the asphalt flow is routed to circulate bark into the tank. This position is usually used to heat up the asphalt before attempting to distribute it through the spray bar 18. In this first position of the rotary switch 55, the suckback valves 101 and 103, the return valve 99 and the suction valves 96 and 97 remain in the positions they held for the spray function (position one). The four-way valve 95 is turned to a 0° position so the flow through the valve is as indicated in FIG. 4c(i). With the valves in the foregoing positions, the asphalt is pumped through the asphalt pump 21 and returned via conduit 69 to the asphalt tank 14 without flowing through the spray bar 18.

The second position of the rotary switch 55 changes only the position of the four-way valve 95. This position of the valve allows circulation of the asphalt through the spray bar 18 without spraying, thereby functioning to allow the bar and its associated valves to warm up in order that they may be made ready for operation. In this second position of the rotary switch 55, the four-way valve 95 moves to a 90° position which provides for flow of asphalt through the valve as indicated in FIG. 4c(ii). After the asphalt has been brought up to a sufficient temperature, in the circulation in tank position (position one), the valves can be changed to position three so the warmed asphalt can be circulated in the spray bar 18.

When the master spray switch 71 is closed while the rotary switch 55 is in its second position, relay 83 is activated thereby switching control of the swash plate from the rheostat 61 to the spray rate potentiometer 37 and the four-way valve 95 is activated to turn from its 90° position, FIG. 4c(ii), to its 180° position, FIG. 4c(iii). In its 90° position, the four-way valve 95 allowed the asphalt to enter one end of the spray bar 18 and exit at the opposing end. In contrast, the 180° position of the four-way valve 95 routes asphalt to both ends of the spray bar, thereby causing the flow to meet somewhere near the middle of the bar as indicated by the flow arrows in FIG. 4a. Only when the rotary switch 55 is placed in position two will activation of the master spray switch 71 cause discharge of the asphalt because only position two passes power to the master spray switch as indicated by the block diagram of FIG. 2. Without input power from the rotary switch 55, activation of the master spray switch 71 will not pass battery power to the switches 41a or a control signal to the hydraulic/pneumatic actuators 59 for rotation of the four-way valve from 90° to 180° positions.

In keeping with the invention, the rotary switch 55 may be placed in positions one or two by the truck operator in order to set up the required discharge rate for a given application rate. Once the discharge rate is set by adjustment of the potentiometer 37, subsequent changes to the width L of the application pattern made by the opening of manually operated toggle switches 41a will result in the automatic adjustment of the discharge rate X.

Rotation of the rotary switch 55 to position three causes the four-way valve 95 to rotate to a 0° position and also serves to close the suction valves 96 and 97. The remaining valves are unchanged from the previous positions. In position three, one of the load inputs 63a or 63b can be opened to receive asphalt from a primary storage tank or from another truck. From the load input 63a or 63b, the asphalt pump 21 pumps the asphalt into the tank 14 by way of the four-way valve 95 and return line 69.

In position four, asphalt can be loaded into the asphalt tank 14 through either load input 63a or 63b by use of an external pump. In its fourth position, the rotary switch 55 closes the return valve 99, and opens the front and rear suction valves 96 and 97, respectively. By opening the front and rear suction valves 95 and 97 aeration of the asphalt is prevented. The position of the four-way valve 95 remains at 0°.

In position five of the rotary switch 55, the position of the valves remain unchanged and the unload outputs 67a or 67b allow the truck operator to unload the tank 14 without circulating asphalt through the spray bar 18 and thereby contaminating the spray bar if it has been previously cleaned. Also, using the same position of the valves, a handspray unit may be attached to the handspray output 65, and both outputs 67a, 67b kept closed, in order to permit spraying of small areas by hand. By providing a return for the asphalt along return path 69, the excess flow not discharged because of the small output volume from the handspray unit is recirculated back to the tank 14. Of course, in order for the handspray unit to operate, the valves 115 and 117 must be opened. Typically, these valves are hand operated.

Position six of the rotary switch 55 allows the asphalt pump 21 to clean asphalt from the spray bar 18 so that after a job is finished large amounts of asphalt are not left in the spray bar to harden and, thereby, cause serious problems during subsequent use of the equipment. For this cleaning of the spray bar 18, the suction valves 96 and 97 are turned off and the return valve 99 and suckback valves 101 and 103 are opened. With the valves in this position, the asphalt will be drawn from the spray bar 18 through the suckback valves 101 and 103 and into the strainer 98 and asphalt pump 21. Finally, it is delivered to the asphalt tank 14 by way of the return line 69.

In position seven of the rotary switch 55, all the valves are closed. Specifically, in this position of the rotary switch 55, the sucktack valves 101 and 103 are closed and the return valve 99 and suction valves 96, 97 are also closed. Four-way valve 95 is positioned at 0° as shown in FIG. 4c(i). Therefore, the asphalt in the tank 14 is not routed through the pipings and, therefore asphalt cannot be received at either the load inputs 63a or 63b and cannot exit from either the unload outputs 67a or 67b.

Finally, in position eight of the rotary switch 55, the piping can be fully cleaned and the asphalt pump 21 flushed after the suckback operation of position seven by allowing a solvent input (not shown) to receive solvent such as diesel fuel for circulation through the asphalt pump. In addition, position eight also allows for the transfer of asphalt from a first tank to a second tank, using the piping of the distributing apparatus merely as a conduit between tanks and using the asphalt pump 21 as a means for initiating the flow.

From the foregoing, it will be seen that the circuitry contained in the control circuit 41 eliminates the need for either computation or trial runs when the effective length L of the spray bar is changed—by quick and convenient flipping of switches in the group 41a—after a proper drive ratio $\omega_1/\omega_3$ has been established for the hydrostatic transmission 35. With the automatic adjustment of the drive ratio $\omega_1/\omega_3$ provided in response to a change in the length L of the spray bar 18, continual spraying at a constant application rate A can be carried out without interruption.

I claim:

1. In a vehicle with a primary drive source for moving said vehicle and for spreading liquid material on a ground surface, a material distributing apparatus comprising:
    a tank carried on said vehicle for holding said liquid material;
    a discharge element for discharging the liquid material, said discharge element being capable of changing the pattern of distributing said liquid material;
    a pump for initiating and maintaining a controlled rate of flow of said liquid material from said tank to said discharge element;
    first means responsive to said primary drive source for providing to said pump an adjustable drive source that maintains a static drive ratio with respect to said primary drive source such that said rate of flow of said liquid material is automatically adjusted in response to changes in the speed of said vehicle in order to maintain a constant rate of application for the material onto the ground surface despite changes in the speed of the vehicle;
    second means for adjusting the pattern provided by said discharge element;
    third means responsive to change of the distribution pattern provided by said second means for automatically adjusting said drive ratio to said first means so as to adjust the rate of flow of the liquid material from said pump to said discharge element such that the rate of application remains unchanged despite changes in said distribution pattern;
    a network of piping interposed between said pump and said discharge element, said network including valves for network wherein each of said valves includes an actuating means responsive to a signal from a manually operable means; and
    said manually operable means having discrete alternative positions for selecting routes of said liquid material through said network for loading or distributing said material and, in connection with the selections, said third means being responsive to the selection of particular routes to provide a predetermined drive ratio for said first means.

2. A material distributing apparatus as set forth in claim 1 wherein said first means includes a hydrostatic transmission for transferring power from the power sources to said discharge pump.

3. A material distributing apparatus as set forth in claim 1 wherein said discharge element is an elongated bar that has left and right wings which may be folded into out-of-the-way positions,
    fourth means for folding said left and right wings into out-of-the-way positions;
    said second means being responsive to said fourth means for preventing distribution of the liquid material through that part of the bar which has been folded into an out-of-the-way position; and
    said third means being responsive to said fourth means for adjusting said drive ratio in response to a change in pattern caused by the discontinuance of distribution through the wing of the bar lifted into an out-of-the-way position.

4. A material distributing apparatus as set forth in claim 1 wherein said second means includes a plurality of manually operable switches for controlling the distribution pattern of said liquid material by said discharge element such that operation of each of said switches causes an incremental change in an output signal from said second means that is delivered to said third means which, in turn, responds to the incremental change in said output signal by causing a proportional incremental change in the drive ratio of said first means.

5. A material distributing apparatus as set forth in claim 1 wherein said first means includes a control mechanism for manually adjusting the drive ratio of said first means and thereby adjust the application rate to a desired value; and
    said third means modifies the rate of flow set by said first means in response to a change in the distribution pattern as selected by said second means so as to keep the application rate essentially at the desired value.

6. In a vehicle with a power source for spreading liquid material on a road surface, a material distributing apparatus comprising:
    a tank on said vehicle for carrying the material;
    a spray bar on said vehicle of selectively adjustable effective length;
    selection means for adjusting the effective length of said spray bar;
    a discharge pump for pumping the material from said tank to said spray bar;
    hydrostatic transmission joining said power source to said discharge pump in order that said discharge pump may deliver material to said spray bar at selected rates proportional to the speed of said power source, said hydrostatic transmission means having a variable drive ratio;
    first means connected to said hydrostatic transmission and responsive to changes in the effective length of said spray bar by said selection means for adjusting said hydrostatic transmission through a range of drive ratios to maintain a preselected rate of application despite changes in said bar length; and
    said means responsive to changes in the effective length of said spray bar including (1) a network of variable resistance whose value is linearly related to the effective length of said spray bar, (2) a voltage source generating current through said network, and (3) an electromechanical member receiving said current and in response to changes in said current caused by changes in the variable resistance of said network moving a swash plane of said hydrostatic transmission, thereby adjusting the drive ratio of said transmission.

7. A material distributing apparatus as set forth in claim 6 wherein said spray bar is elongated and has left and right wings which are movable to out-of-service positions;

second means for moving said left and right wings between service and out-of-service positions; and said first means connected to said hydrostatic transmission responsive to said second means to adjust the drive ratio of said coupling means as the effective length of said spray bar is changed by moving said left and right wings between their service and out-of-service positions.

8. A material distributing apparatus as set forth in claim 6 including:

second means for setting the proper drive ratio of said coupling means for a given effective length of said spray bar in order to obtain a desired application rate; and said first means connected to said hydrostatic transmission modifies the drive ratio set by said second means in response to changes in the effective length of the spray bar.

9. In a material distributing apparatus having a spray bar which includes a plurality of nozzles for providing application paths of different widths and a pumping system feeding said spray bar and having a selectively variable discharge rate, a control circuit comprising:

first means including a plurality of switches for opening and closing corresponding valves associated respectively with the nozzles of said spray bar;

a second means responsive to each of said plurality of switches for providing signals indicative of the switch positions;

a third means responsive to the signals indicative of the switch positions for adjusting the discharge rate of said pumping system in order to hold the application rate of said material constant in response to changes in the selection of active discharge nozzles by said plurality of switches;

said second means including a network of variable resistance comprising a plurality of discrete resistors wherein each resistor is added in parallel with respect to the network in response to selection of an associated one of said plurality of switches, said network being supplied voltage from a voltage source; and said third means including an electromechanical member for receiving current from said network of variable resistance and whose mechanical motion is responsive to changes in the total resistance and associated changes in current of said network caused by changes in the selected ones of said discrete resistances placed in said network by selection of associated ones of said plurality of switches, whereby movement of said electromechanical member adjusts said variable discharge rate of said pumping system.

* * * * *